United States Patent [19]

Dugua

[11] 4,352,857
[45] Oct. 5, 1982

[54] SPHERICAL CRYSTALLINE SODIUM URANATE AND PROCESS OF PRODUCING SAME BY ADJUSTING THE URANIUM CONTAINING SOLUTION IN CRYSTALLIZER

[75] Inventor: Jacques Dugua, Vernaison, France

[73] Assignee: PCUK Produits Chimiques Ugine Kuhlmann, Courbevoie, France

[21] Appl. No.: 101,235

[22] Filed: Dec. 7, 1979

[30] Foreign Application Priority Data

Dec. 8, 1978 [FR] France ................................ 78 34581

[51] Int. Cl.³ ............................................ B32B 15/02
[52] U.S. Cl. .................................... 428/402; 428/328; 423/253; 423/260
[58] Field of Search ................. 23/300, 301 R, 302 T, 23/305 R, 313 FB, 313 P; 428/402, 328; 423/253, 260

[56] References Cited

U.S. PATENT DOCUMENTS

| | | | |
|---|---|---|---|
| T909,003 | 4/1973 | Hicks et al. | 23/313 P |
| 1,814,300 | 7/1931 | Duschak et al. | 23/301 R |
| 2,346,517 | 4/1944 | Thompson | 23/301 R |
| 3,126,250 | 3/1964 | Hermans | 423/253 |
| 3,215,493 | 11/1965 | Mollard et al. | 23/301 R |
| 3,758,664 | 9/1973 | Gerrald | 423/253 X |
| 3,892,539 | 7/1975 | Midler | 23/300 X |
| 3,966,873 | 6/1976 | Elikan et al. | 423/260 |

*Primary Examiner*—P. Ives
*Attorney, Agent, or Firm*—Pennie & Edmonds

[57] ABSTRACT

Sodium uranate which is easy to handle, characterized by the spherical form of the grains, the average diameter thereof, between 40 and 150 μm, their uncompacted apparent bulk density of 2.5 to 3.5 g/cm³ and a flow value higher than or equal to 95, measured on the CARR scale produced by diluting the sodium uranate-containing solution introduced into a fluid bed reactor to between about 0.5 and 5 g/l within a period of less than about 2 seconds before the uranium-containing solution enters the reactor.

3 Claims, 1 Drawing Figure

├─┤ 100 μm

├───┤ 100 μm

4,352,857

SPHERICAL CRYSTALLINE SODIUM URANATE AND PROCESS OF PRODUCING SAME BY ADJUSTING THE URANIUM CONTAINING SOLUTION IN CRYSTALLIZER

TECHNICAL FIELD

The invention relates to the crystallization and agglomeration of sodium uranate from uranium containing solutions and to a new physical form of sodium uranate particles which are easy to handle.

BACKGROUND ART

According to the present-day technique for extracting the uranium contained in uranium-bearing ores, the uranium, after being purified and concentrated, is recovered in the form of acid or alkaline liquors. The uranium-bearing concentrates are precipitated from these acid or basic solutions in a medium of $SO_4$—and/or $CO_3$—by means of sodium hydroxide, in particular. The precipitation is carried out in a series of tanks arranged in a cascade, maintained at 60°–80° C. This results in a very fine precipitate of sodium uranate which is difficult to filter and dry, and which has a particle size of between 0 and 15 $\mu$m. These particles are irregular in shape and the product obtained has poor flow properties. Handling such a product involves hygiene and safety problems because of the emission of dust which is rich in uranium, both in the factory where the uranium-bearing concentrate is produced, when the product is dried and the solid is placed in a cask, and also in the refining plants which take these uranium-bearing concentrates in order to purify them and convert them into the oxide, fluoride or metal.

Various methods are known for bringing the crystallized substances into the physical state required by the user. The technique of agglomerating fine particles in a fluidized bed is one of the most effective. It consists in forming polycrystalline agglomerates from fine particles injected into a solution of the product to be crystallized with a suitable supersaturation. These fine particles grow and become welded together to form polycrystalline agglomerates of a specific particle size. These fine particles and agglomerates are kept in suspension by means of a given flow rate of supersaturated solution which is fed in or recycled in. The state of supersaturation remains constant thanks to the continuous addition of the substance to be crystallized. This technique is described in French Pat. No. 1,187,352, of 29.11.1957, by Produits Chimiques Ugine Kuhlmann.

If this technique of crystallization in a fluidized bed is applied to uranium-bearing solutions, it does not lead to the formation of polycrystalline agglomerates, but considerable nucleation of very fine particles occurs. Great dilution of the uranium-containing solutions is one method of reducing the frequency of nucleation so as to obtain particles of sufficient diameter. However, this solution is difficult to apply on an industrial scale as there is a conflict between the conditions required for good fluidization and the conditions which correspond to adequate productivity per unit of volume of the apparatus. Moreover, dilution cannot be carried out using water, which would weigh down the water balance of the process, and conventional dilution with mother liquors involves a risk of substantial nucleation, as there is always an excess of sodium hydroxide in the recyclable mother liquors.

DISCLOSURE OF THE INVENTION

This invention provides a means of overcoming this difficulty, by enabling uranium-containing solutions with concentrations of between 1 and 40 g/l of uranium to be treated using the fluidized bed technique. All uranium-bearing solutions can be treated using this process, which is particularly advantageous for the treatment of solutions obtained from an alkaline attack on uranium-bearing ores, and for treating sodium solutions obtained after purification, with a solvent or an ion exchanger resin, of the liquors resulting from an acid or alkaline attack on the ores.

Figure 1:
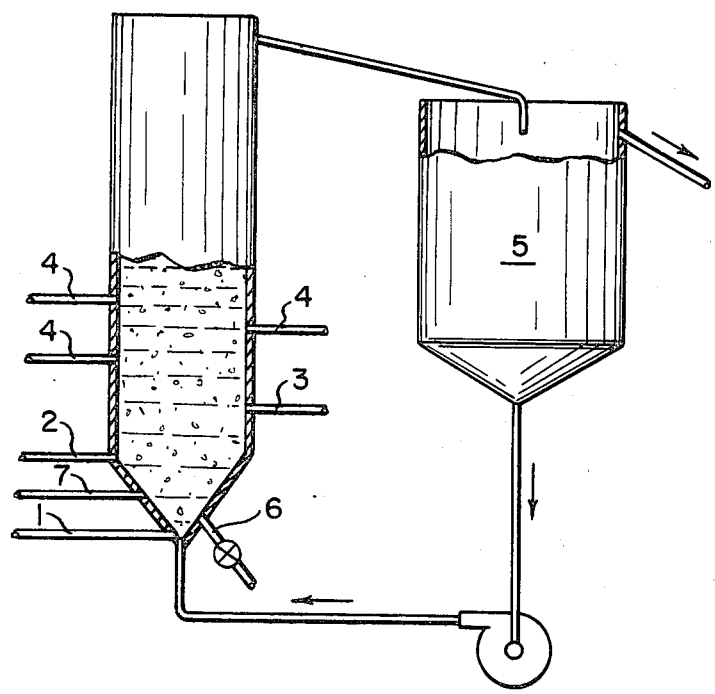
FIG. 1 is a schematic view of a conventional fluid bed crystallizer.

The invention consists in adding to these uranium-bearing solutions, before they are introduced into the crystallizer, mother liquors of crystallization of sodium uranate, within a very short period of less than 2 seconds, using suitable injectors, so as to bring them to a uranium titre of from 0.5 to 5.18 g/l.

With this process, sodium uranate can be obtained directly in the form of spherical particles of a specific particle size, having a high apparent bulk density and very good flow properties; as a result, this quality of sodium uranate is very safe when handled, as the release of dust rich in uranium is minimized. Thus, the process perfected by the applicant solves a major problem for factories which produce uranium-bearing concentrates or use them in the later stages of the preparation of nuclear fuels, as the processes currently used in the preparation of sodium uranate yield a powdery product which is dangerous to handle.

When the uranium-bearing solution is neutralised with sodium hydroxide in the fluidized bed, a certain supersaturation with sodium uranate occurs. If the uranium-bearing solution is sufficiently dilute, nucleation is slight and occurs slowly, in a medium containing 2 to 10 g/l of NaOH, the average content of the fluidized bed. I have found that there is a very short time lag preceding the nucleation and that this time lag enables the addition of mother liquors containing 2 to 10 g/l of NaOH to the uranium-bearing solution when the solution is introduced into the fluidized bed. Such a solution is well distributed in the fluidized bed before nucleation occurs with the crystals already present in the fluidized bed and leads to a regular enlargement of the particles.

The uranium-bearing solution is fed into the fluidized bed crystallizer at one or more points by means of suitable injectors, by means of which the solution can very rapidly be mixed with a quantity of mother liquor which varies according to the initial uranium content of the solution to be crystallized.

The sodium hydroxide is introduced through simple perforations at various judiciously chosen points of the crystallizer. The concentration of the sodium hydroxide solutions may be between 20 and 300 g/l, depending on the particular case.

A controlled addition of fine particles of sodium uranate into the fluid bed is necessary in order to maintain the production of sodium uranate with a constant particle size over a period of time. It may be effected in known manner by continuously or discontinuously added very small crystals prepared separately. Another original feature of the invention is the introduction into the crystallizer of a certain amount of uranium-bearing solution corresponding to 1 to 10% of the treated uranium. This solution must have a sufficient uranium concentration, 5 to 40 g/l, to ensure that it forms, in situ, the fine particles necessary for the satisfactory operation of the fluidized bed. The apparatus may thus function autonomously, without the need for an external source for manufacturing fine crystals.

Figure 2:
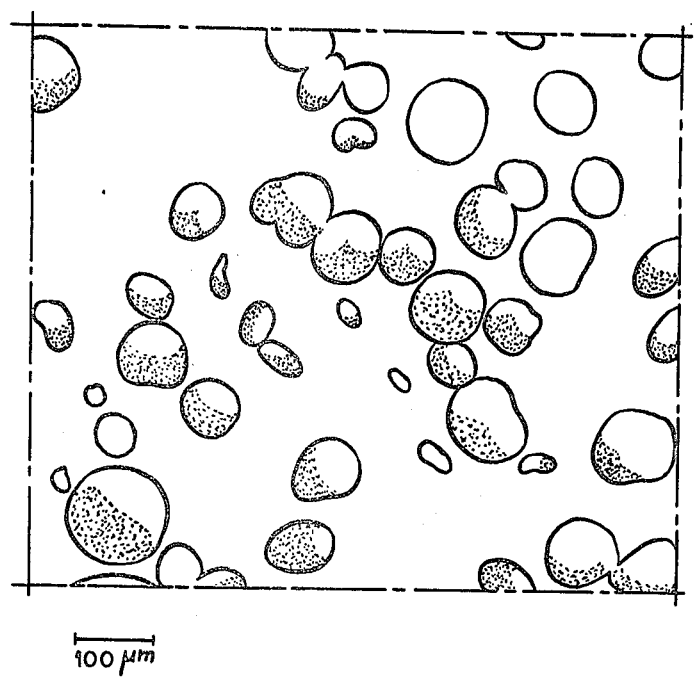
FIG. 2 is a drawing of a microphotograph of the sodium uranate crystals produced according to the invention.

The sodium uranate obtained according to the invention takes the form of smooth, spherical agglomerates, like those shown in FIG. 2, with an average diameter of between 40 and 150 μm, thus giving them good flow properties, while its uncompacted apparent bulk density measured according to the standards NF A 95-111 of February 1977 is from 2.5 to 3.5 g/cm³. When it is handled, there is no release of the very light, fine particles liable to pollute the atmosphere of the site and inconvenience users. The flow properties according to the R. L. CARR test described in "Chemical Engineering", 18.1.1965, page 163, have a value greater than or equal to 95 for the sodium uranate precipitated in a series of tanks in a cascade arrangement according to the usual process has a flow value of the order of only 30.

EXAMPLE 1 (Comparative)

291 ml of a 40 g/l NaOH solution are slowly added over a period of 40 minutes to a 1 liter beaker-type container containing 300 ml of uranium-bearing solution with a uranium content of 37.6 g/l, maintained at 80° C., to which 10 g of sodium uranate from a previous operation have been added beforehand. The contents of the beaker are constantly agitated with a stirrer rotating at 150 r.p.m. After filtration and drying, the uranate obtained has the following characteristics: particle size of between 1 and 10 μm, uncompacted bulk density of 1.04 g/cm³, flow properties according to the CARR test: 33.

The product thus obtained, which corresponds to that obtained industrially at present, has a very fine particle size, a low bulk density and poor flow properties which make it difficult and dangerous to handle.

EXAMPLE 2 (Comparative)

Sodium uranate is prepared by the technique of crystallization in a fluidized bed using the normal process. The mother liquors of crystallization of sodium uranate are circulated at 80° C. at a flow rate of 35 l/hour from bottom to top in a closed circuit in a cylindrical/conical column 0.88 m in diameter and 0.6 m high (FIG. 1). In addition to their other constituents, these mother liquors contain 5 g/l of NaOH and supersaturated with sodium uranate. Through orifice No. 1 located in the base of the conical part, 0.64 l/hour of a sodium uranyl carbonate solution containing 37.6 g/l of uranium are introduced, whilst 0.64 l/hour of the same solution are distributed through orifices 2 and 3. 1.35 l/hour of a 40 g/l sodium hydroxide solution at 20° C. are added through other tubes (4). The hourly production of uranium in the form of sodium uranate drawn off through the orifice 6 is 48 g/h. Two grams per hour of uranium in the form of fine particles of sodium uranate, 1 to 10 μm, are added to the decanter (5), representing about 4% of the quantity of uranium treated.

Figure 3:
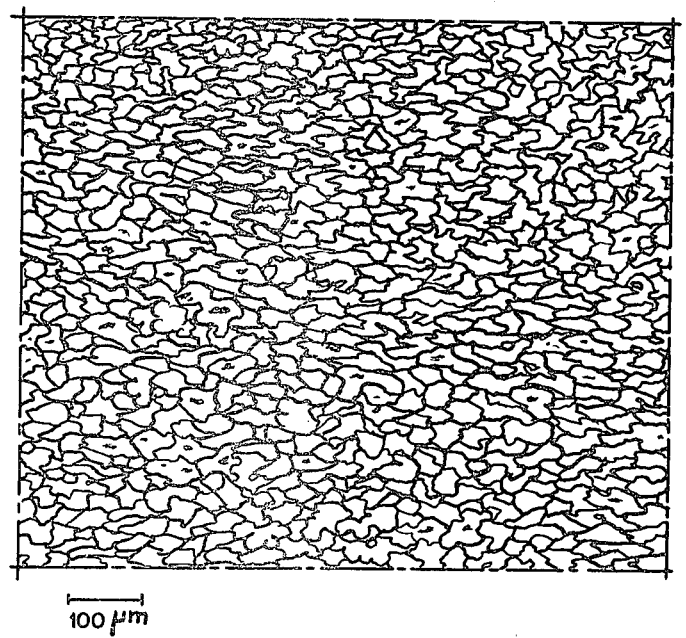
FIG. 3 is a drawing of a microphotograph of sodium uranate crystals produced according to prior art procedures as described in Example 1 (comparative) below.

With this system, agglomeration is very poor and there is, above all, an abundant formation of very fine particles with an average diameter of between 1 and 20 μm. These particles are irregular in shape, as can be seen from FIG. 3. The uncompacted apparent bulk density is 1.5 g/cm³ and the flow value according to the CARR test is 38. The product obtained is difficult and dangerous to handle, like that of Example 1.

Best Modes of Carrying Out The Invention

The following non-restrictive examples describe various embodiments of the process.

EXAMPLE 3

The same procedure as in Example 2 is used but the additional flow of 0.64 l/hour of the uranium-bearing solution introduced through orifices 2 and 3 is introduced through 2 suitable injectors placed in the tubes 2 and 3. Through each injector, 2 l/hour of mother liquor at 20°-40° C. containing, inter alia, 5 g/l of NaOH are introduced. The addition of the mother liquors to the uranium-bearing solution is carried out in 0.7 second, in the injector whose cavity is designed for this purpose. Two g/hour of uranium in the form of fine particles of sodium uranate are added to the fluid bed under the same conditions as in Example 2.

The granulometric distribution of the agglomerates obtained at equilibrium is as follows, in diameter:

| | |
|---|---|
| $\phi > 100$ μm: | 5% by weight |
| $75 < \phi < 100$ μm: | 20% |
| $50 < \phi < 75$ μm: | 60% |
| $40 < \phi < 50$ μm: | 14.5% |
| $30 < \phi < 40$ μm: | 0.5% |

The uncompacted apparent bulk density is 3.12 g/m³.

The flow value according to the CARR test is 96, i.e. a value which is comparable with dry sand. As can be seen from FIG. 2, the agglomerates obtained are smooth and spherical. The absence of small particles in these products, their high density and their good flow properties make them safe and easy to handle.

EXAMPLE 4

The same procedure as in Example 3 is used, but the 2 g/hour of uranium are added in the form of 53 ml/h of a uranium-bearing solution containing 37.6 g/l of uranium, through orifice no. 7 located in the conical part of the crystallizer.

The sodium uranate obtained has substantially the same qualities as those described in Example 3 and it is safe and easy to handle.

| | |
|---|---|
| $\phi > 100$ μm: | 6% |
| $75 < \phi < 100$ μm: | 22% |
| $50 < \phi < 75$ μm: | 58% |
| $40 < \phi < 50$ μm: | 13.7% |
| $30 < \phi < 40$ μm: | 0.3% |

The uncompacted apparent bulk density is 3.08 g/cm³ and the flow value according to the CARR test is 95.

I claim:

1. Crystalline sodium uranate having a spherical grain form, an average grain diameter of between about 40 and 150 μm, an uncompacted apparent bulk density of between about 2.5 and 3.5 g/cm³, and a flow value higher than or equal to about 95 measured on the CARR scale.

2. In a process for producing sodium uranate crystals which comprises introducing an uranium containing solution containing about 1 to 40 g/l of uranium and sodium hydroxide into a crystallizer to produce a supersaturated solution of sodium uranate and maintaining the uranium containing solution in the state of a fluidized bed by a continuous ascending flow of a supersaturated solution of the same sodium urante, the improvement which comprises adding to the uranium containing solution being introduced into the crystallizer, before it is introduced into the crystallizer mother liquors of crystallization of sodium uranate, in a sufficient amount to adjust the uranium content to between about 0.5 and 5.18 g/l within a period of less than about 2 seconds.

3. Process according to claim 2 which comprises adding to the uranium solution in the crystallizer an uranium solution containing between about 5 and 40 g/l of uranium in a quantity corresponding to between about 1 and 10 percent of the uranium being treated to form fine seed crystals in situ in the solution in the crystallizer.

* * * * *